United States Patent
Delbeke et al.

(10) Patent No.: US 12,351,041 B1
(45) Date of Patent: Jul. 8, 2025

(54) IMPACT DETECTION ON VEHICLE UNDERSIDE

(71) Applicant: Zoox, Inc., Foster City, CA (US)

(72) Inventors: Gildas Laurent Pascal Delbeke, Stratford-Upon-Avon (GB); MacKenzie Cunningham, San Mateo, CA (US); Haley Riesenberg, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 240 days.

(21) Appl. No.: 18/056,138

(22) Filed: Nov. 16, 2022

(51) Int. Cl.
*B60L 3/00* (2019.01)
*B60L 58/10* (2019.01)

(52) U.S. Cl.
CPC ........... *B60L 3/0007* (2013.01); *B60L 3/0046* (2013.01); *B60L 58/10* (2019.02)

(58) Field of Classification Search
CPC ....... B60L 3/0007; B60L 3/0046; B60L 58/10
USPC .......................................................... 701/22
See application file for complete search history.

(56) References Cited

U.S. PATENT DOCUMENTS

| | | | |
|---|---|---|---|
| 2015/0171485 A1* | 6/2015 | Rawlinson | B60L 50/64 429/62 |
| 2016/0248060 A1* | 8/2016 | Brambrink | C08L 69/00 |
| 2017/0261473 A1* | 9/2017 | Sung | G01N 29/4481 |
| 2018/0048032 A1* | 2/2018 | Takatsuka | G01L 5/0052 |
| 2018/0120415 A1* | 5/2018 | Mcquillen | G05D 1/0257 |
| 2020/0090320 A1* | 3/2020 | Xu | G06F 16/5866 |
| 2020/0161717 A1* | 5/2020 | Fritz | H01M 10/613 |
| 2020/0225650 A1* | 7/2020 | Terrones Castillo | B62D 65/02 |
| 2020/0226853 A1* | 7/2020 | Ahmed | H04L 9/0618 |
| 2020/0335833 A1* | 10/2020 | Schmidt | H01M 10/48 |
| 2020/0388888 A1* | 12/2020 | Mikami | B60L 3/12 |
| 2021/0009063 A1* | 1/2021 | Kim | B60R 21/0136 |
| 2021/0174493 A1* | 6/2021 | Xu | G06N 3/049 |
| 2021/0188093 A1* | 6/2021 | Gyani | B60L 50/64 |
| 2021/0336298 A1* | 10/2021 | Thurmeier | H01M 10/48 |
| 2022/0029215 A1* | 1/2022 | Kellner | B60K 1/04 |
| 2022/0407164 A1* | 12/2022 | Kellner | H01M 50/227 |
| 2022/0416356 A1* | 12/2022 | Hauenstein | H01M 10/625 |
| 2023/0006297 A1* | 1/2023 | Günther | H01M 50/289 |
| 2023/0179745 A1* | 6/2023 | Baek | B62D 41/00 348/148 |
| 2023/0271504 A1* | 8/2023 | Wan | H01M 50/242 701/22 |
| 2024/0044992 A1* | 2/2024 | Dernotte | G01R 31/392 |
| 2024/0239388 A1* | 7/2024 | Soule | B61L 27/10 |

* cited by examiner

*Primary Examiner* — Krishnan Ramesh
(74) *Attorney, Agent, or Firm* — EIP US LLP

(57) ABSTRACT

An impact with an underside of a battery enclosure of a vehicle is classified based at least on processing impact sensor outputs to generate battery impact classification data. The impact sensor outputs are received from an impact sensor arrangement associated with the underside of the battery enclosure, the impact sensor arrangement being configured to generate the impact sensor outputs in response to a deformation of the underside of the battery enclosure. The vehicle is caused to perform an action in response to the battery impact classification data.

19 Claims, 12 Drawing Sheets

IMPACT DETECTION ON VEHICLE UNDERSIDE

BACKGROUND

A vehicle, for example a battery electric vehicle, may have a battery disposed on the underside of the vehicle. The battery may be provided with a battery enclosure, which may have a protective plate on the underside to reduce the probability of damage in the event of an impact on the underside of the vehicle, for example an impact with debris on a road. It may be advantageous to detect impacts with the underside of the vehicle that may damage the battery.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
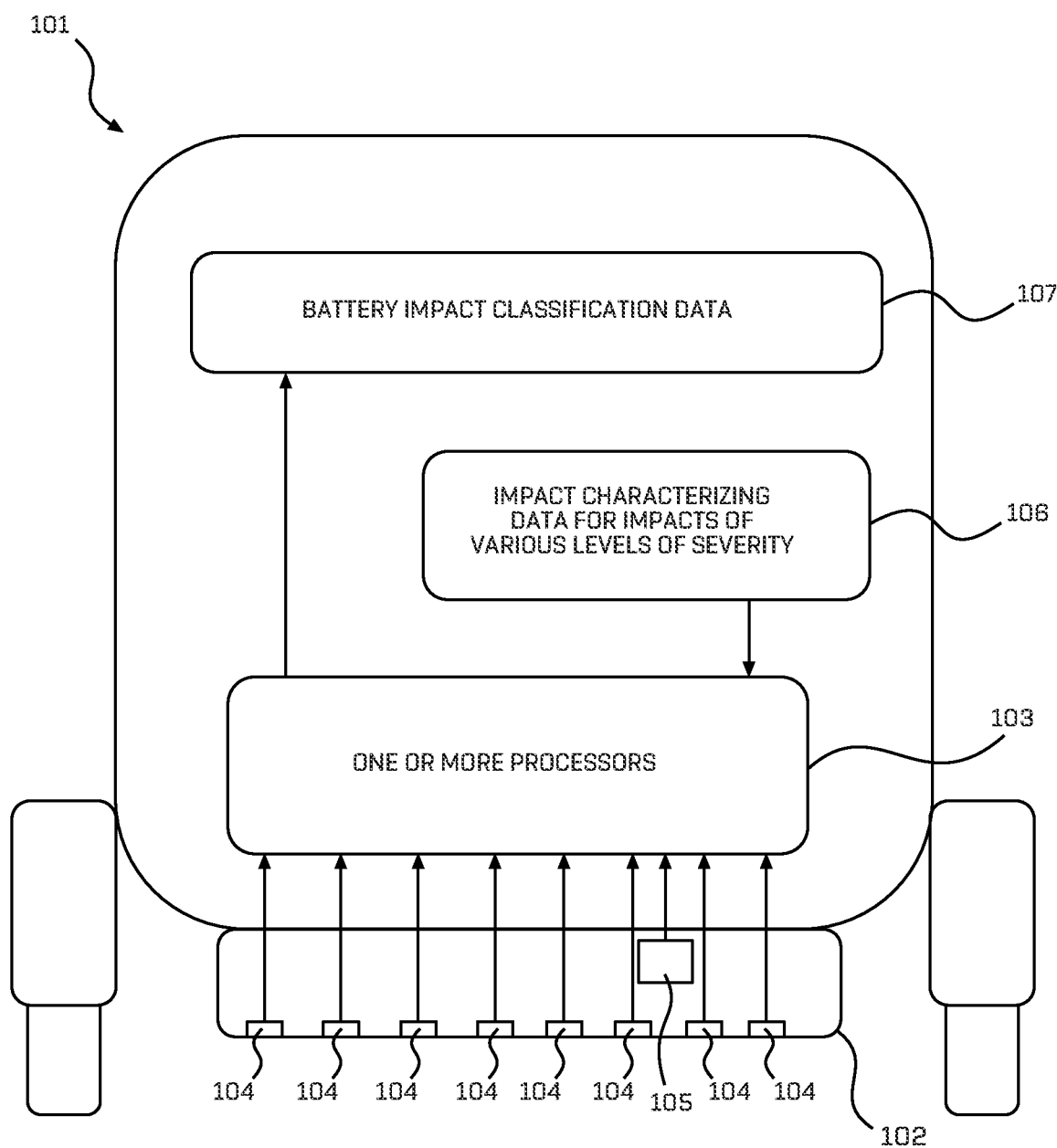
FIG. 1 is a schematic diagram showing a vehicle comprising a system for classifying an impact with the underside of a battery enclosure of a vehicle.

This disclosure is generally directed to a system and method for classifying an impact with the underside of a vehicle, and, in particular, for generating battery impact classification data for an impact with the underside of a battery enclosure of a vehicle, which may be an autonomous electric vehicle. The battery impact classification data may comprise an indication of a severity or classification of an impact with the underside of a battery enclosure. The vehicle may be caused to take action in response to the battery impact classification data, for example the vehicle may maneuver to the side of a road and stop, deactivate a battery pack or a portion of the batter pack, or the vehicle may continue its journey and send a maintenance request message.

An impact with the underside of a vehicle may be caused, for example, by collision with debris on a road. For example, a component that has become detached from another vehicle may be deposited onto the road and there may not be sufficient time to take evasive action to avoid a collision with the debris. In another example, part of a load being carried by another vehicle may fall into the path of the vehicle. There are many scenarios in which items may be dropped or otherwise deposited in the path of a vehicle. An impact on the underside of the vehicle may also be caused by the vehicle passing over a fixed obstacle on the ground, for example a rock, wall or curb. For example, the vehicle may collide with an obstacle on the ground when maneuvering to avoid a potential collision with another vehicle.

An electric vehicle may have a battery in which components of the battery are protected by a battery enclosure. The battery may be a high voltage battery for providing power to one or more traction motors and to various other systems of the vehicle, for example generating approximately 400V across its terminals. In other examples, other voltages higher or lower than 400V may be generated. For reasons of efficient packaging and beneficial weight distribution, the battery enclosure may be mounted with the underside of the battery enclosure exposed to the road beneath the vehicle, forming part of the exterior of the underside of the vehicle. The underside of the battery enclosure may comprise a protective panel, which is intended to reduce the probability of a collision with the underside of the battery enclosure causing damage to components of the battery. For example, the protective panel may be composed of a grade of metal having a relatively large Young's modulus in comparison with the Young's modulus of other exterior panels of the vehicle, and the protective panel may be thicker than other exterior panels of the vehicle. However, the protective panel may be damaged or pierced by a sufficiently energetic and localised impact, potentially causing damage to components of the battery.

In some cases, damage to the components of the battery may present a safety hazard to occupants of the vehicle. The amount of time available to evacuate the vehicle before the safety hazard becomes critical may depend on the type of damage to the battery. For example, damaging a battery cell of the battery, for example by distortion or piercing, may lead, in some cases, to a potential of a battery fire, for example due to thermal runaway in which an exothermic reaction in a battery cell may cause exothermic reactions in adjacent battery cells. A thermal runaway event may occur relatively quickly after an impact, so that occupants of the vehicle should be evacuated as quickly as possible. For example, a battery enclosure may be designed to contain a fire due to thermal runaway for a given number of minutes, for example 5 minutes. The vehicle can be caused to stop and the occupants can be evacuated within the given time.

In another example of an impact causing damage to components of the battery, the battery may have channels containing a liquid coolant, and damage to the channels may lead to an obstruction of the flow of coolant or a leakage of coolant from a channel, which may lead to an eventual overheating of the battery. Such a failure may present a safety hazard after an extended delay, for example a delay of an hour and in some cases longer, in an example 18 hours. In the case of such damage, evacuation of the vehicle is not urgent and an autonomous vehicle may be able to complete its journey and then return to a depot for maintenance.

Other types of damage to the battery components are possible due to an impact, for example a short circuit between bus bars carrying current within the battery, damage to electronic control components and many other types of damage.

As described in this disclosure, battery impact classification data, which may comprise an indication of a level of severity of an impact with the underside of the battery enclosure, is generated based on processing outputs of an arrangement of impact sensors associated with an underside of the battery enclosure. The impact sensors may be, for example, strain gauges, audio sensors, contact sensors and/or accelerometers, which are configured to generate respective sensor outputs in response to a deformation of the underside of the battery enclosure. For example, the impact sensors may be distributed across the underside of the battery enclosure. The classification data may be generated by a process comprising determining that the outputs of the impact sensors meet a criterion for a respective level of severity.

In an example, determining that the outputs of the impact sensors meet the criterion may comprise comparing the outputs of the impact sensors with impact characterizing data. For example, a distribution of magnitudes of impact sensor outputs as a function of position on the underside of the battery enclosure may be compared with impact characterizing data comprising pre-determined magnitude distributions of impact sensor outputs for a variety of different types and positions of impact. The comparison may be, for example, by correlation. The impact characterizing data may be derived, for example, by simulation of an impact using a computer model of the parts of the battery and battery enclosure for impacts at various positions on the underside of the battery pack, for impacts with various shapes of object and for impacts at various speeds.

The impact characterizing data may alternatively, or in addition, comprise test data from trial impacts on a test system and/or data gathered from other vehicles relating to impacts during operation of the vehicles, for example vehicles in a fleet of autonomous vehicles. The impact characterizing data may include data relating to the severity of the simulated and/or trial impacts, for example an indication as to whether or not the battery enclosure is pierced, whether damage resulted to the components of the battery, and if so what type of damage, and a likely time to risk of fire. Any action that the vehicle should take in response to the impact may also be included in the impact characterization data.

In response to the battery impact classification data of an impact meeting a given criterion, one or more processors of the vehicle may cause the vehicle to perform an action. For example, if the impact sensor output data matches impact characterizing data indicating that that battery enclosure is not pierced and that no significant damage has resulted to the components of the battery, the vehicle may make a record of the impact and send a message to a fleet management system requesting a maintenance check. The vehicle may continue on its journey.

However, if the impact sensor output data matches impact characterizing data indicating that that battery enclosure is pierced and that significant damage has resulted to the components of the battery, the actions taken by the vehicle may depend on the type of damage to the components of the battery indicated by the impact characterizing data to which the output data matches. The vehicle may be caused to stop, and to send a message to a highway authority requesting assistance, for example.

An indication of the level of severity of the impact may be generated by processing data relating to the outputs from one or more battery condition sensors in addition to the impact sensors associated with the underside of the battery enclosure. The outputs may be compared with impact characterizing data which includes the outputs of the one or more battery condition sensors derived from simulations and/or tests of various types of impact. A degree of confidence of a match with the impact characterizing data may be made by, for example, a correlation, and/or a maximum likelihood approach, or comparison with a threshold determined from the impact classification data.

Examples of the battery condition sensor include a gas pressure sensor indicating the gas pressure in the battery enclosure. For example, the impact characterizing data may indicate that a gas pressure sensor in the battery enclosure registers a drop in pressure in simulations and/or trials in which piercing and/or rupture of the battery enclosure occurred. In an example, gas, for example air, in the battery enclosure may, in normal operation, have a higher pressure than atmospheric pressure in the environment of the vehicle, and a drop in pressure may indicate an escape of gas from the battery enclosure due to impact. In other examples, a distortion of the battery enclosure may reduce its internal volume, leading to an increase in gas pressure. In each simulate or tested impact, any change in the gas pressure may be recorded in the impact characterizing data.

In an example, the battery condition sensor, or at least one of the battery condition sensors, may include one or more gas composition sensor, for example a sensor for carbon dioxide and/or carbon monoxide. The impact characterizing data may indicate that a gas composition sensor records an increase in concentration of combustion products, for example carbon dioxide and/or carbon monoxide, in the case of combustion and/or thermal runaway caused by damage to one or more cells of the battery.

The battery condition sensor, or at least one of the battery condition sensors, may include a voltage sensor configured to sense a voltage between parts of the battery, for example between terminals of the battery and/or across groups of battery cells, for example between bus bars connecting groups of battery cells. The impact characterizing data may indicate a fall in a voltage within the battery, for example a voltage between bus bars of the battery, in cases where a cell has a short circuit between its terminals caused by a fault in the cell, for example caused by impact damage. Additional details may be found in U.S. patent application Ser. No. 17/810,211 filed on Jun. 30, 2022 entitled "Battery Event Detection", the entire contents of which are hereby incorporated by reference.

Generating the battery impact classification data may include determining a degree of confidence of a match between data representing the output of one or more battery condition sensors and the impact characterizing data. This may comprise determining that there is agreement within a given margin from more than one of the battery condition sensors, for example the voltage sensor and the battery condition sensor, with the impact characterizing data.

Generating the indication of the level of severity of the impact may comprise determining a time of an impact by processing the plurality of respective sensor outputs associated with the underside of the battery enclosure and also determining that a condition of the battery has changed indicative of a battery fault within a given time from the determined time, by processing the output of the battery condition sensor.

In an example, the battery impact classification data may comprise an indication of an amount of time in which safe operation can continue before battery failure. For example, if a loss of battery coolant is detected by detecting a drop in coolant pressure or coolant level in the absence of other indications of battery failure, then there may be time, for example an hour or more, to complete a journey before a potential battery failure. However, if combustion products are detected by a gas composition sensor, then there may be only a matter of minutes before battery failure, for example 5 minutes. The battery failure may be, potentially, a thermal runaway event in which an exothermic reaction in one or more battery cells may spread to other battery cells, potentially resulting in a fire. In this case, the vehicle may be caused to stop as soon as possible and to instruct the occupants to leave the vehicle, by generating an audio message for example, and/or by generating visual indications.

In an example, the battery impact classification data may comprise a classification into a plurality of levels of severity of an impact. In an example, an impact may be classified as a first, highest, level of severity if a match is detected between the outputs of the impact sensors and impact characterizing data that indicates a risk of a piercing of the battery enclosure, combined with one or more battery condition sensors having outputs corresponding to impact characterizing data indicating a severe fault condition in the battery. For example, a shape of a distribution of the magnitudes of the impact sensor outputs as a function of position of the impact sensor may match a corresponding shape of a distribution in the impact characterizing data, and the outputs of the battery condition sensors may correspond to impact characterizing data indicating the presence of combustion products combined with a drop in battery voltage. In this case, the vehicle may be instructed to stop as soon as safely possible and to instruct the occupants to leave the vehicle.

In an example, an impact may be classified as a second, lower level of severity if a distribution of impact sensor outputs against distance matches impact characterizing data that indicates a risk of a piercing of the battery enclosure, but the battery condition sensors do not indicate a severe fault condition in the battery. For example, a gas pressure sensor may indicate a drop in gas pressure indicative of a piercing of the battery enclosure, but no drop in battery voltage or combustion products are detected. In this case, the vehicle may, for example, continue to a known convenient location at which the occupants of vehicle can be asked to leave, for example by an audio message. The known convenient location may be a recently visited safe location. In an example, a replacement vehicle may be summoned to pick up the occupants so that they can continue their journey. An estimate of the time to failure can be used to select a location at which to stop. The output of the battery condition sensors may be monitored during the continuing journey following the impact and if a deterioration of the battery condition is detected, a shorter time to failure may be estimated, and the planned stopping point may be changed so that the occupants may leave the vehicle more quickly than was initially planned.

An impact may be classified as a third, yet lower, level of severity if, for example, a distribution of impact sensor outputs against distance does not match impact characterizing data that indicates a risk of a piercing of the battery enclosure and the battery condition sensors do not indicate a severe fault condition in the battery, but nevertheless the impact sensor outputs match classification data indicating that a maintenance check is required before taking on further missions. In this case, the vehicle may be caused to continue its mission as planned and then return to a depot for a maintenance check.

An impact may be classified as a fourth, even lower level of severity if, for example, the impact detection sensors and battery condition sensors produce outputs that match impact charactering data indicating an impact unlikely to cause any damage to the internal components of the battery, but that the incident should be recorded in an appropriate data store indicating that the damage should be reviewed at the next scheduled maintenance appointment.

A further, lower level, classification of the impact may indicate that no action is required.

A record may be kept of impacts and the classification of the impacts, so that the classification of one or more previous impacts may be used to generate the classification of a current impact. For example, a risk of cumulative damage may be included as part of the battery impact classification data. For example, a repeat of an impact at or near the same part of the battery enclosure may increase a probability of causing internal damage to the battery, and furthermore repeated shocks to a battery cell may increase a risk of damage to the cell.

The battery impact classification data may include an indication that part of the battery is potentially damaged, but that it is safe to continue to use another part of the battery. For example, the battery may comprise two or more separate enclosures, in which case damage to one enclosure may not preclude the continuation of the mission using the battery modules in the undamaged enclosure and the battery modules in the damaged enclosure may be electrically disconnected to reduce the risk of failure of potentially damaged cells.

In an example, generating the indication of the level of severity of the impact may comprise machine learning, for example supervised machine learning. For example, a series of trial simulations and/or collisions with various objects may be carried out, and a machine learning algorithm may be trained to recognize various classes of levels of severity of the impact. For example, weights of a neural network may be trained to produce outputs detecting various classes of levels of severity of the impact. The plurality of respective outputs from the plurality of impact sensors associated with the underside of the battery enclosure, and/or the one or more battery condition sensor outputs may be applied in real time as inputs to a neural network. The neural network may be trained by a process comprising the steps of performing a plurality of trial impacts and/or simulations of impacts on the underside a vehicle and recording data for respective impacts. The recorded data may be, for example, data indicating measured or simulated damage to components of the battery and/or a degree of severity of the impact. The data may be categorized into a plurality of categories of degrees of severity, and the neural network may be trained to recognize a category.

FIG. 1 shows a vehicle 101 comprising a system for generating battery impact classification data, which may include an indication of a degree of severity of an impact with the underside of a battery enclosure of a vehicle. The vehicle 101 may be an autonomous vehicle and the battery enclosure 102 is shown under the floor of the vehicle in this example, such that the underside of the battery enclosure is facing the road surface under the vehicle. In alternative configurations, the vehicle may have more than one battery enclosure, for example one battery enclosure may be located on each side of the vehicle, and the battery enclosures may enclose a vertical stack of battery modules, each comprising battery cells. However, in examples of the alternative configurations, the underside of each battery enclosure may be on the underside of the vehicle facing the road, as in the case where the battery enclosure is under the floor as shown. The underside of a battery enclosure facing the road may experience an impact from an object, such as debris on the road or other obstacles in the path of the vehicle, which collide with the underside due, for example, to the object being sufficiently large that the ground clearance of the vehicle is not sufficient to avoid a collision. The underside of the battery enclosure may be provided with a protective panel, which may be thicker than the other parts of the battery enclosure and which may be composed of a material having a greater Young's modulus than the other parts of the battery enclosure.

The underside of the battery enclosure may be stiffer than a typical external body panel of a vehicle, so that relatively low energy impacts, for example having an energy that may be expected to deform a typical external body panel of the vehicle, may cause less deformation of the underside of the battery enclosure. As a result, the degree of deformation may be more difficult to measure than would be a deformation of a external body panel on the upper part of the vehicle, because the magnitude of the deflection in the deformation may be smaller and the deformation may be more localized. If a sharp object pierces the protective panel, then the damage may be potentially serious, but the damage may be localized. In an example, strain gauges may be associated with the underside of the battery enclosure, for example attached to the inside of a protective plate on the underside of the battery enclosure, and deployed, for example, in a grid arrangement. The use of strain gauges as the impact sensors allows detection of strain in the underside of the battery enclosure caused by an impact, in cases where the deflection caused by the impact is small. By deploying a plurality of strain gauges in a grid arrangement, for example with an even distribution of strain gauges across the protective panel, the probability of detecting a localized deflection from an impact, for example as may be associated with a piercing event, is increased.

In order to allow detection and classification of an impact with an underside of a battery enclosure, an arrangement of impact sensors, the arrangement of impact sensors comprising a plurality of impact sensors 104, is associated with the underside of the battery enclosure 102. The sensors may be fixed, by adhesive or other means, to the inside or outside of the underside of the battery enclosure or may be embedded within it. The underside of the battery enclosure may comprise a protective panel of stiffer and/or thicker material than the remainder of the battery enclosure. The impact sensors 104 in the arrangement of impact sensors are configured to generate respective impact sensor outputs in response to a deformation of the underside of the battery enclosure. The deformation may comprise an increase in strain in at least parts of the enclosure. The deformation may be a temporary deformation and associated relative movement between the parts of the battery enclosure, for example in modes of oscillation, that may be detected by an accelerometer. Data representing the outputs of accelerometers as a function of time may form part of the impact characterizing data with which data representing the output of the impact sensors is compared to generate battery impact classification data, which may comprise an indication of a level of severity of an impact.

A battery condition sensor 105 is also shown. In examples, one or more battery condition sensors 105 may include one or more of a gas pressure sensor, a gas composition sensor, a voltage sensor and a battery coolant pressure sensor.

The vehicle comprises one or more processors 103 configured to process the outputs of impact sensors 104 and, in examples, the outputs of the one or more battery condition sensors 105 to generate battery impact classification data 107 for an impact to the underside of the battery enclosure. The one or more processors 103 may be configured to process impact characterizing data 106, which may be generated by simulation and/or tests for impacts at various levels of severity with the underside of the vehicle.

Figure 2A:
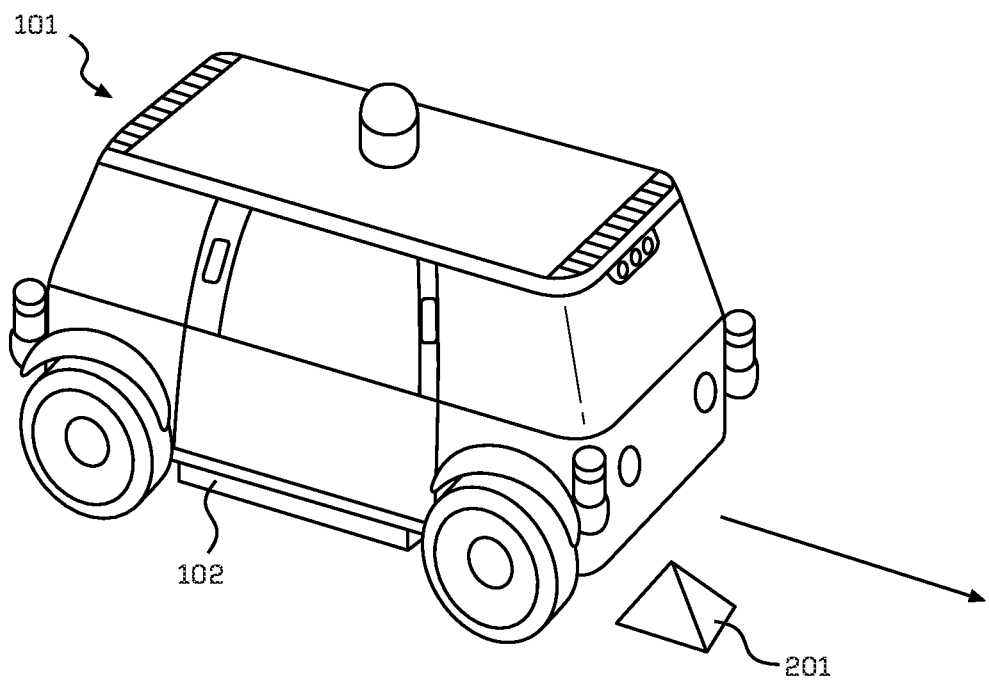
FIG. 2a and FIG. 2b show perspective views of a vehicle having a battery enclosure disposed under the vehicle in collision with an object that may damage the battery by piercing the battery enclosure.
Figure 2B:
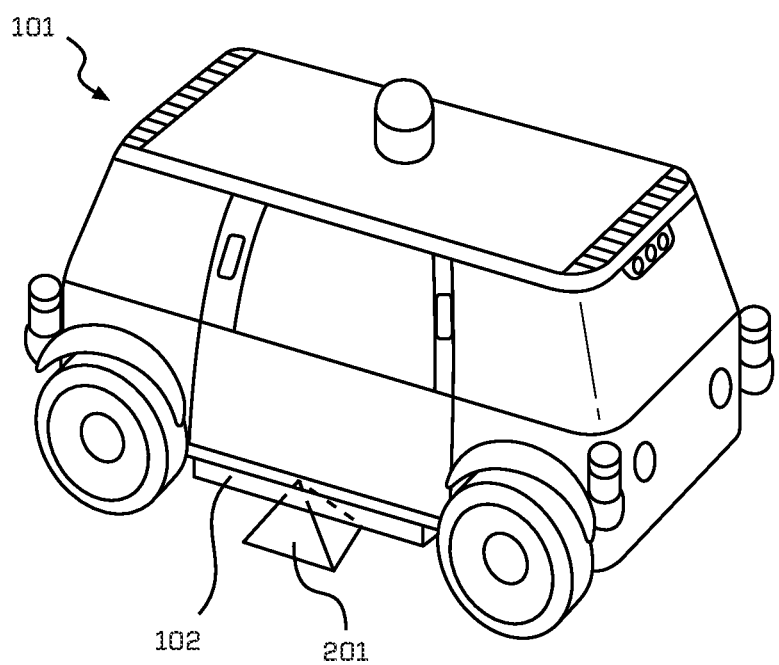

FIG. 2a and FIG. 2b show perspective views of a vehicle 101 having a battery enclosure 102 disposed under the vehicle 101 in collision with an object 201 that may damage the underside of the battery enclosure 102 by piercing the battery enclosure 102. The object as illustrated may impact a small proportion of the surface area of the underside, so that the force of the impact is directed to a small part of the underside of the battery enclosure. This may cause a localized fracture or piercing of the battery enclosure. In an alternative arrangement (not shown) the battery enclosure may not be located entirely under the vehicle, instead the battery enclosure may extend upwards above the floor level of the vehicle, but an underside of the battery enclosure may still form the underside of the vehicle. In this case also, the object 201 may pierce the battery enclosure.

Figure 3:
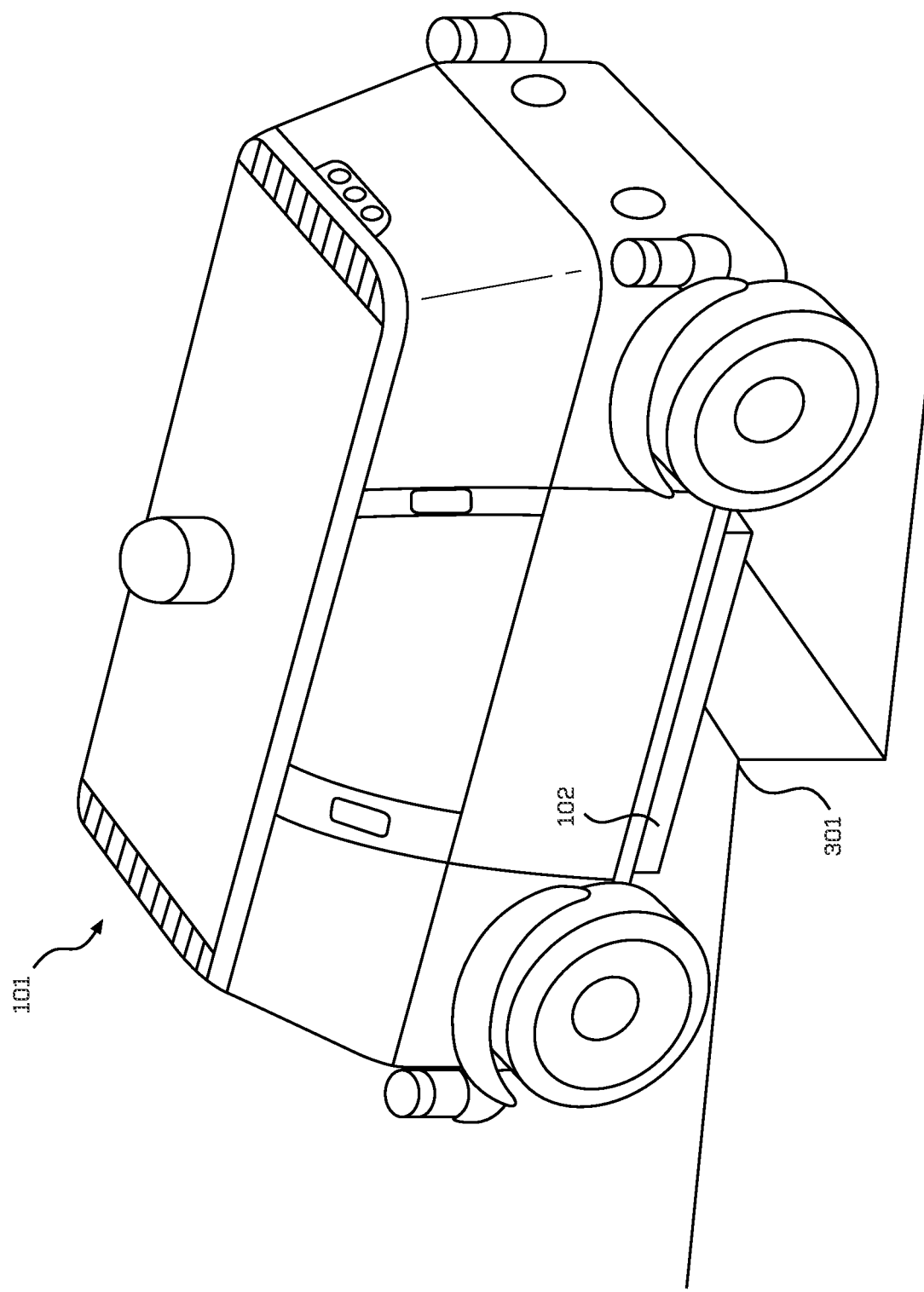
FIG. 3 is a schematic diagram showing a perspective view of a vehicle having a battery enclosure disposed under the vehicle in contact with an obstacle that may cause damage over a large area of the underside of the battery enclosure without piercing the battery enclosure.

FIG. 3 shows a perspective view of a vehicle 101 having a battery enclosure 102 disposed under the vehicle in contact with an obstacle 301 that may cause damage over a large area of the underside of the battery enclosure 102 without piercing the battery enclosure. The object 103, in the example illustrated, may be a step or a raised section protruding from the ground surface. The vehicle may have driven over the step, for example, to avoid a collision with another vehicle. Because the force of the impact is spread over a relatively larger proportion of the underside of the battery enclosure compared to the case illustrated by FIG. 2a and FIG. 2b, it is less likely that the battery enclosure will be pierced.

Figure 4A:
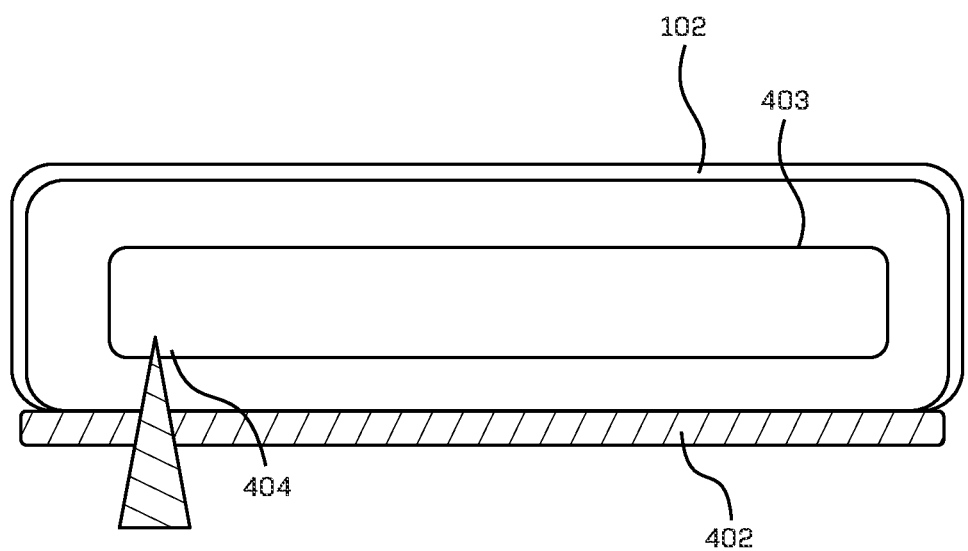
FIG. 4a is a schematic diagram showing an object piercing a battery enclosure of the vehicle.

FIG. 4a is a schematic diagram showing an object 404 piercing a battery enclosure 102 of the vehicle. The underside of the battery enclosure 102 comprises a protective panel 402, which, in the example illustrated, is pierced by the object 404. The object 404 also makes contact with, and pierces, a battery module 403 within the battery enclosure. The battery module may contain battery cells and battery coolant channels, for example. If either the battery cells or the coolant channels are pierced or damaged, the battery may be in a potentially dangerous condition.

Figure 4B:
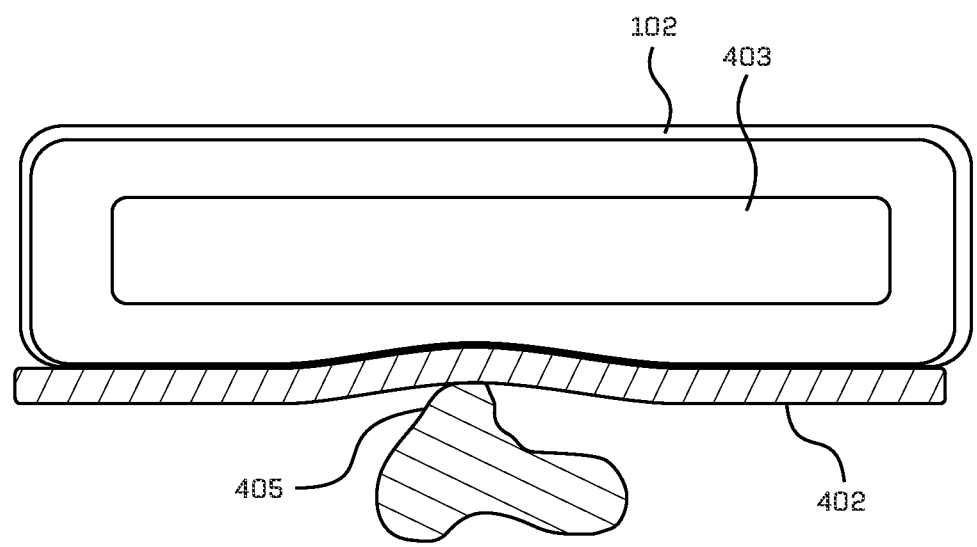
FIG. 4b is a schematic diagram showing an object deforming but not piercing a battery enclosure of the vehicle.

FIG. 4b is a schematic diagram showing an object 405 deforming but not piercing a battery enclosure 102 of the vehicle. As shown, the object 405 may have a more rounded edge in contact with the underside of the battery enclosure than has the object 404 of FIG. 4a. In this example, he protective panel 402 is deformed but not pierced. The outputs of the impact sensors 104 may be compared with the impact characterizing data gathered from simulation results and/or test results for various types of impact to distinguish between a piercing impact and a more generalized impact, as described below in connection with FIG. 10.

Figure 5:
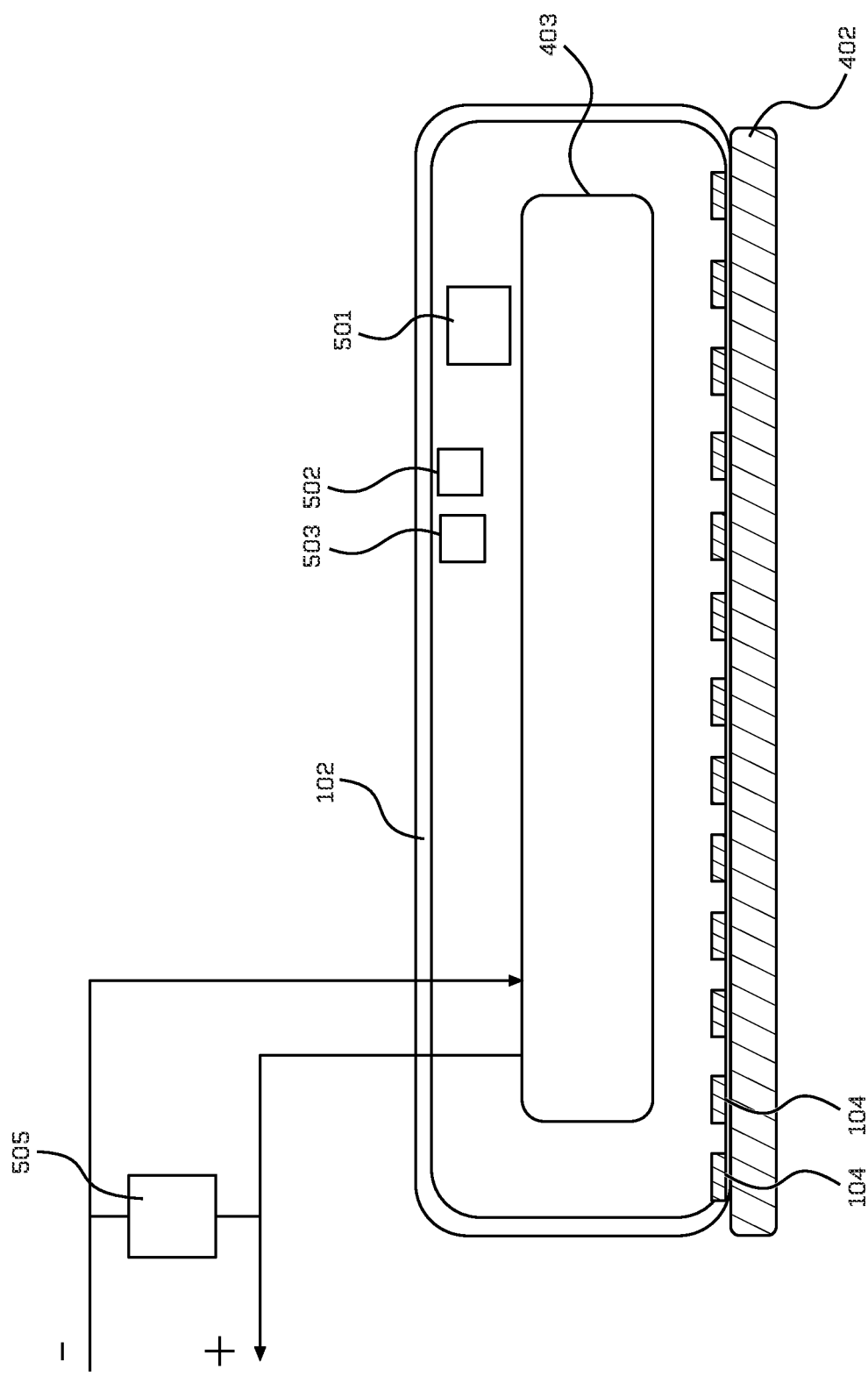
FIG. 5 is a schematic diagram showing a battery enclosure having a plurality of impact sensors associated with the underside of the battery and having battery condition sensors.

FIG. 5 is a schematic diagram showing a battery enclosure having battery condition sensors, comprising a gas pressure sensor 501, gas composition sensors 502, 503 and a voltage sensor 505. The gas pressure sensor 501 may measure an absolute pressure, or in an example, may measure a pressure of the interior of the battery enclosure relative to the pressure in the outside environment. The gas within the battery enclosure may be, in normal use, air having a similar composition to atmospheric air. However, in the case of a fault in one or more battery cells, the pressure may increase, due to release of gasses from damaged cells, for example in a venting event. This may be caused by heating of the cell and evaporation of electrolyte. Furthermore, combustion of the cell due to thermal runaway or ignition of electrolyte may also cause an increase in gas pressure due to an increase in temperature and a release of combustion gases. In other scenarios, the gas pressure within the battery enclosure may fall in the event of an impact, due to release of over-pressure within the enclosure due to a puncture of the enclosure. The effect on gas pressure of various types of impacts causing various levels of severity may be logged as a result of simulations and/or tests, and data representing the logged results may form part of the impact characterizing data to which sensor data is compared to determine a level of severity of an impact. In examples, the impact characterizing data may include a time sequence of gas pressure sensor outputs, and in examples a time sequence of outputs of other sensors, for various types of impact and levels of severity of impact. The patterns of the time sequences may be compared with measured data, by correlation or other means, to determine a likely severity of impact.

In an example, the impact characterizing data may comprise threshold levels for each sensor. It may be required that given sensors are producing an output above a given respective thresholds for detection of an impact of a given level of severity. In examples, the comparison of the output of a single sensor, for example a voltage sensor or a pressure sensor, to a threshold may not in itself provide a sufficiently reliable indication of an impact of a given level of severity. However, a combination of two or more of the outputs of sensors of different types may give a more reliable result.

Figure 6:
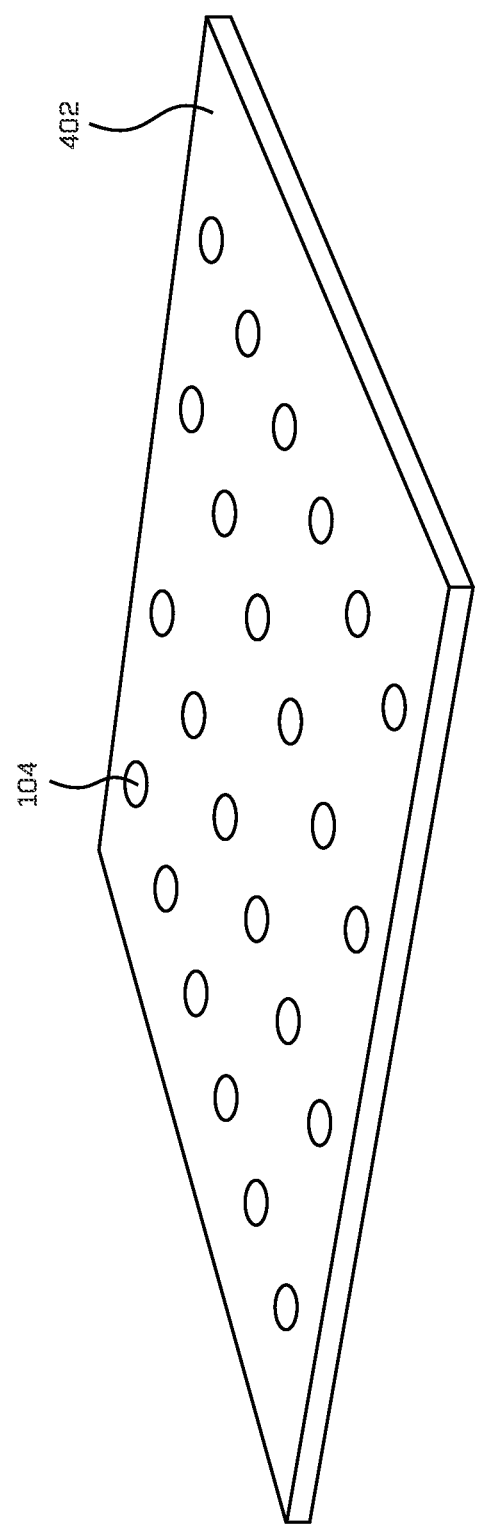
FIG. 6 is a schematic diagram showing a distribution of impact sensors on the underside of a battery enclosure in examples.

FIG. 6 is a schematic diagram showing an arrangement of impact sensors 104 on the underside of a battery enclosure in examples. In examples, the impact sensors may be distributed in a grid pattern. The placement of impact sensors may be arranged to detect impacts over most of the area of the underside of the battery enclosure. To this end, the grid pattern may extend across most of the area of the underside. If there are components of particular sensitivity within the battery enclosure, the impact sensors may be arranged so that there one or more impact sensors are disposed on parts of the enclosure which are adjacent to particularly sensitive components, for example coolant channels, within the battery enclosure. In an example, the impact sensors 104 are stain gauges deployed across the underside of the battery enclosure, in an evenly-spaced two-dimensional grid arrangement, and the impact characterizing data is in the form of a heat map, in which sensor output magnitude is represented as a function of position of the sensor.

Figure 7:
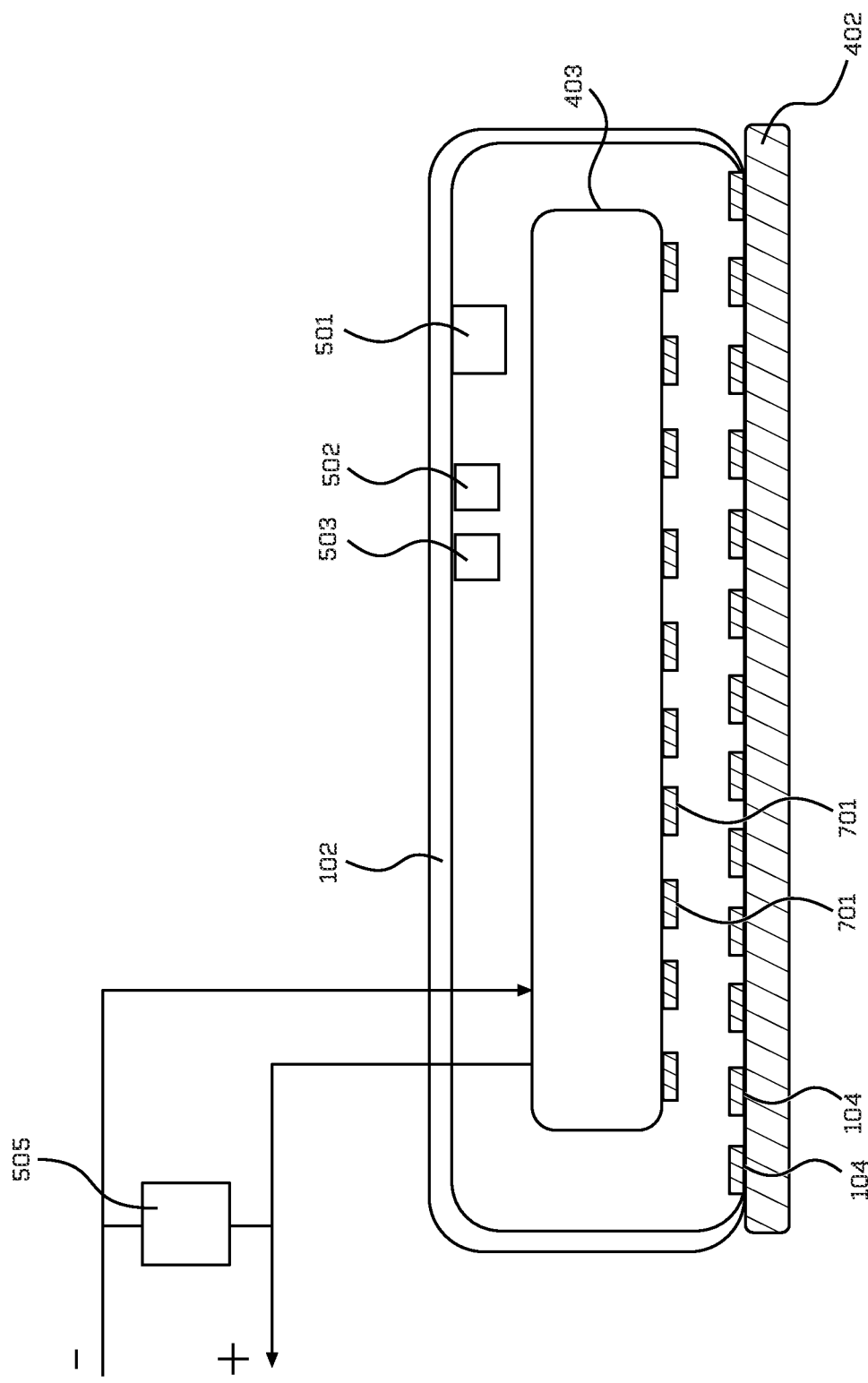
FIG. 7 is a schematic diagram showing further impact sensors associated with a battery module within the battery enclosure in examples.

FIG. 7 is a schematic diagram showing further impact sensors 701 associated with a battery module 403 within the battery enclosure 102 in examples. For example, the further impact sensors 701 may be accelerometers attached to the underside of the battery module 403, and the impact sensors 104 attached to the underside of the battery enclosure may also be accelerometers. Comparing the outputs measured from the impact sensors 104 and further impact sensors 701 with the corresponding outputs in the impact characterizing data may provide an indication of the severity of the impact. In particular, if the impact sensors 701 associated with the battery module measure less acceleration than the impact sensors 104 associated with the underside of the battery module, then it may be expected that damage to the battery module would be less severe than if both sets of impact sensors were found to measure a similarly high acceleration, which may indicate that an object has pierced the protective panel and is in contact with the battery module. The impact characterizing data may include data for the outputs of the further impact sensors 701 in simulated and/or measured impact cases of various severities.

In an example, the further impact sensors 701 may be accelerometers attached to the battery cells themselves, for example to a bank of cells, so that the impact characterizing data may be used to distinguish between cases where a pierced battery pack results in damage to the cells themselves and cases where it does not, on the basis of the relative outputs of the impact sensors 104 and the further impact sensors 701. In an example, the further impact sensors may alternatively or in addition be attached to the vehicle body. For example, in cases where the outputs of the impact sensors 104 and the further impact sensors 701 on the vehicle body have similar outputs, this may indicate that a general shock has occurred to the vehicle rather than an impact localized to the underside of the battery enclosure. This may be characterized and a less severe impact with regard to the probability of damage being caused to the battery.

Figure 8:
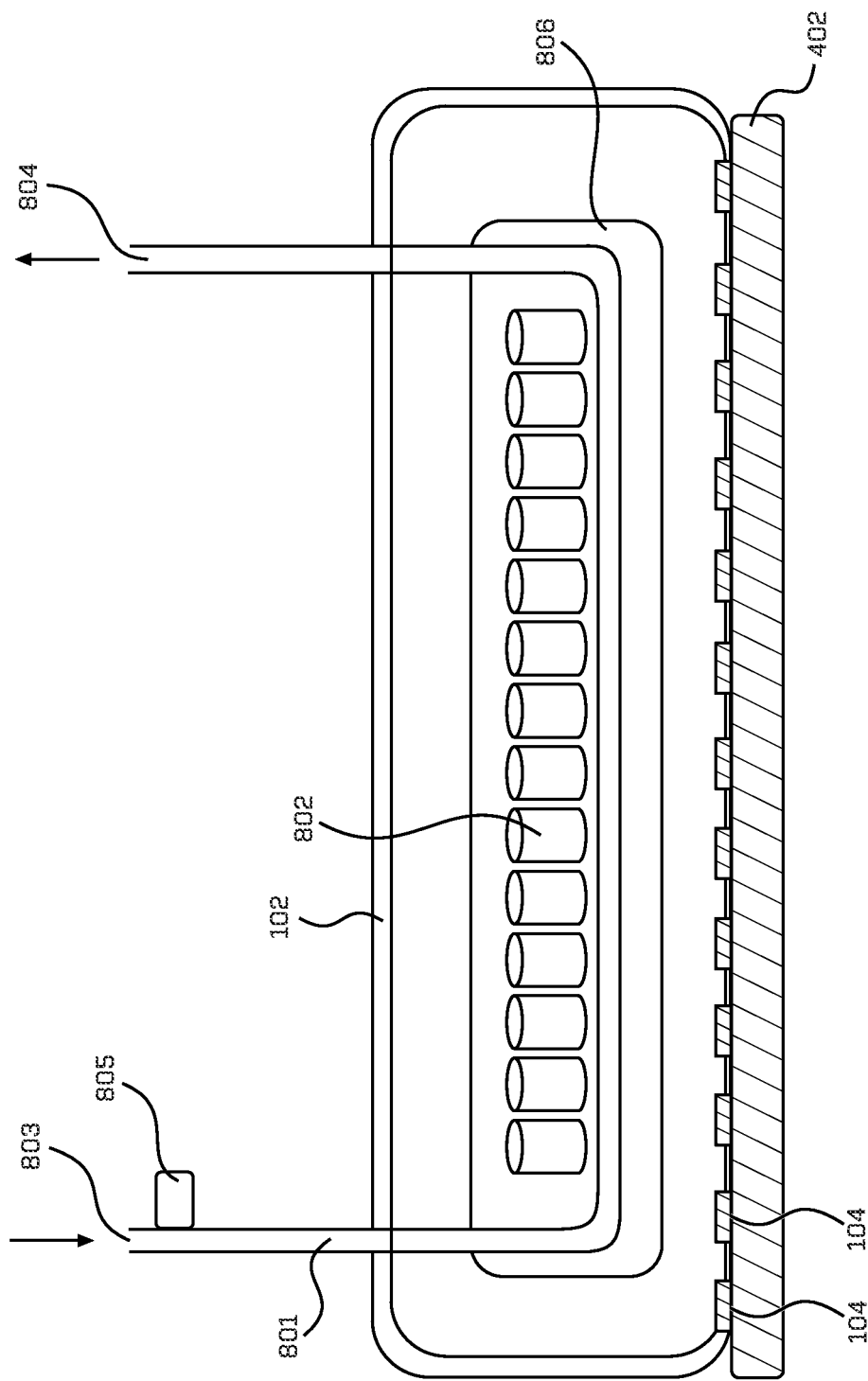
FIG. 8 is a schematic diagram showing a coolant channel and battery cells within a battery module within the battery enclosure in examples.

FIG. 8 is a schematic diagram showing an example of a configuration of battery components with the battery enclosure. A coolant channel 801 is provided through which coolant fluid may flow. The coolant channel is typically in thermal contact with the battery cells 802. The coolant may conduct heat away from the battery cells when required and may also be used to conduct heat to the battery cells when required. As shown, the coolant channel may have an inlet 803 and an outlet 804. The coolant channel may be provided with a coolant pressure sensor 805. A shown, the coolant channel 801 may be close to the underside of the battery module 806. As a result, the coolant channel may be vulnerable to damage if an object were to penetrate the protective panel 104 on the underside of the battery enclosure. The schematic view shown may not correspond with the actual physical arrangement of the coolant channel. In an example, the coolant used to cool the battery cells may be the same coolant that is used in the heating and ventilation system of the vehicle and in the system for cooling digital processors of the vehicle. If the coolant channel is damaged, then the coolant pressure may fall, as detected by the coolant pressure sensor 805.

Figure 9:
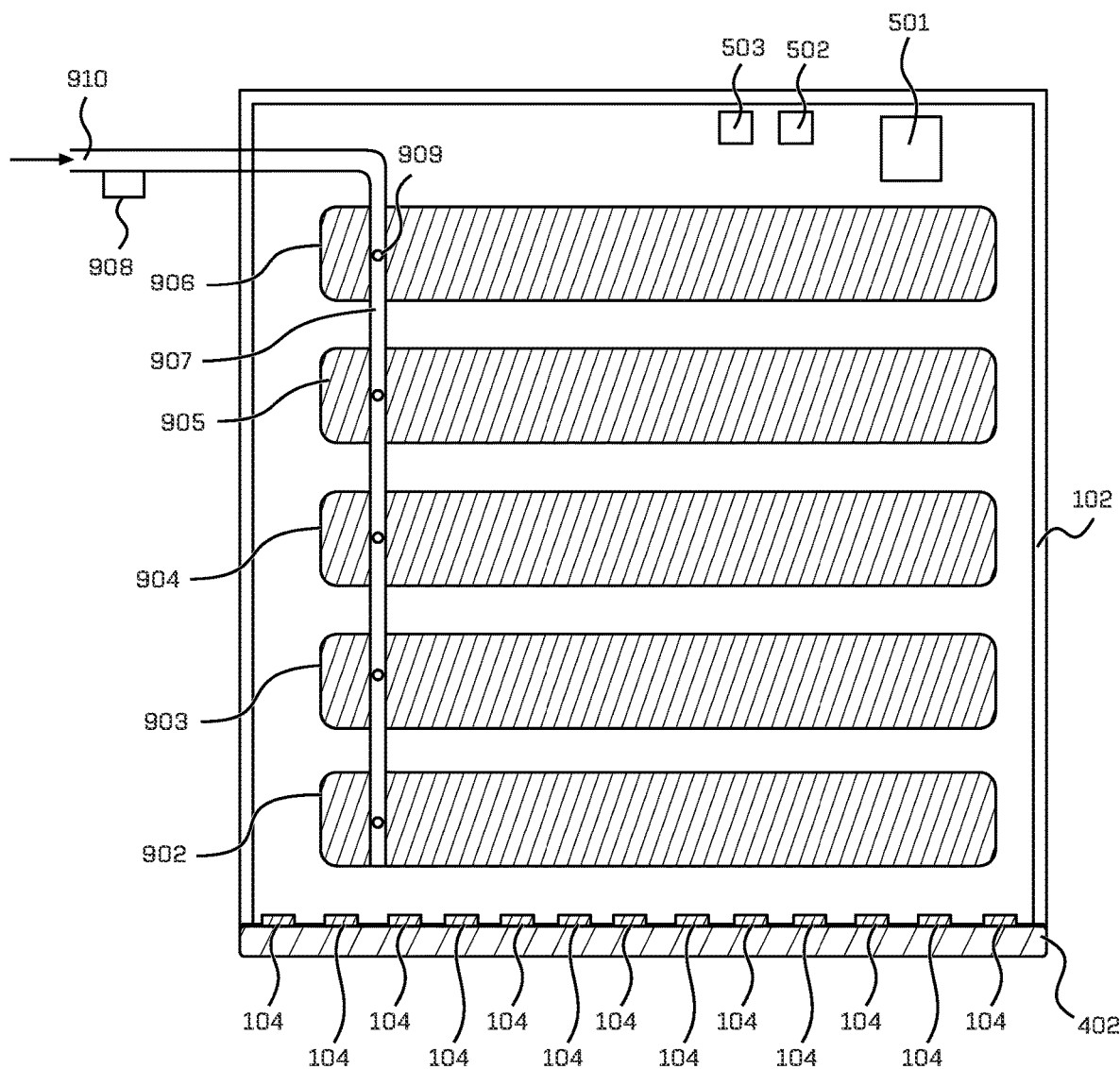
FIG. 9 is a schematic diagram showing a battery enclosure containing a plurality of battery modules in examples.

FIG. 9 is a schematic diagram showing an arrangement of a battery enclosure, in which battery modules 902, 903, 904, 905, 906 are stacked vertically. The arrangement shown may be an alternative to an arrangement in which the battery enclosure is situated under the floor of a vehicle as shown in FIGS. 2a, 2b and 3. The battery module 902 at the bottom of the stack is the most likely module to sustain damage in an impact with the underside of the battery module. The battery enclosure is provided with, in this example, a gas pressure sensor 501, gas composition sensors 502, 503. In this example, the there is a coolant channel 907 provided, which connects the inlet 910 to a coolant port 909 for each battery module. Within each battery module, there is a coolant channel running from the coolant port to a coolant outlet port. The coolant channel is provided with a coolant pressure sensor 908. There may also be a voltage sensor provided (not shown) to sense a voltage of the battery. In the vertically stacked arrangement of battery modules of FIG. 9, it is likely that if there is any damage to a battery module due to an impact with the underside of the battery enclosure, it is likely to be to the battery module 902 closest to the underside. In an example, if damage to a battery module is indicated by the battery impact classification data, then the battery module 902 may be disconnected from the vehicle power supply to reduce a risk of further damage.

In an example, the vehicle battery may comprise two or more battery enclosures. In a case where the battery impact classification data indicates damage to one battery enclosure and not to another, the output circuit from the battery cells in the damaged battery enclosure may be disconnected from the vehicle power supply to reduce a risk of further damage. The output from the battery cells in the one or more undamaged battery enclosures may be used to continue powering the vehicle to a safe stopping point.

Figure 10:
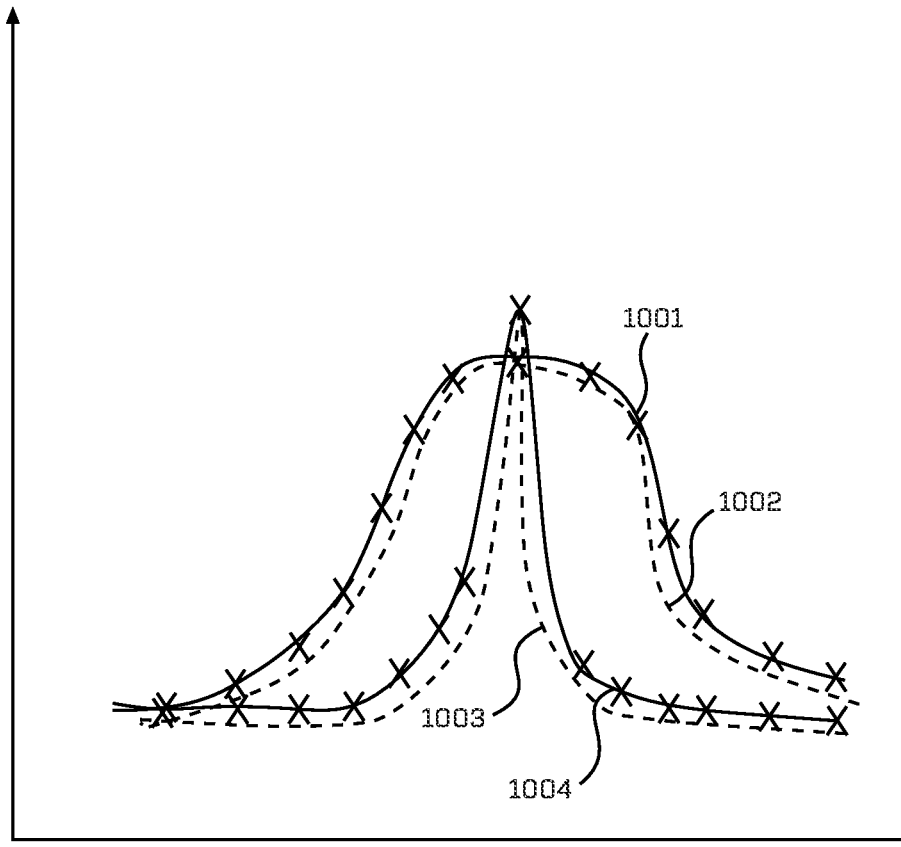
FIG. 10 is a graph showing magnitude of impact sensor outputs as a function of position of the respective impact sensor on a protective panel on the underside of a battery enclosure, for cases of an impact likely to cause piercing of the protective panel and of an impact less likely to cause piercing of the protective panel and also showing impact characterizing data selected as a match for each case.

FIG. 10 is a graph showing magnitude of sensor outputs as a function of position of the respective impact sensor on a protective panel on the underside of a battery enclosure. Curve 1004 shows impact sensor 104 outputs for a case of an impact localized to relatively small area of the underside of the battery module. This may be an impact that is likely to cause piercing of the protective panel. Curve 1003 shows impact characterizing data, based on a simulation and/or test, that is a closest match, of the stored characterizing data examples, to the measured data of curve 1004. In an example method of determining a closest match, a correlation between the magnitude vs. distance characteristic of curve 1004 and the magnitude vs. distance characteristic of curve 1003 may found to be higher than a threshold level, so that the severity level associated with the characterizing data of curve 1003 may be taken as the level of severity of the impact.

Curve 1001 in FIG. 10 shows impact sensor 104 outputs for a case of an impact distributed over a relatively larger area of the underside of the battery module than was the case for curve 1004. This may be an impact that is less likely to cause piercing of the protective panel. Curve 1002 shows impact characterizing data, based on a simulation and/or test, that is a closest match, of the stored impact characterizing data examples, to the measured data of curve 1001, so that the severity level associated with the impact characterizing data of curve 1002 may be taken as the level of severity of the impact.

Figure 11:
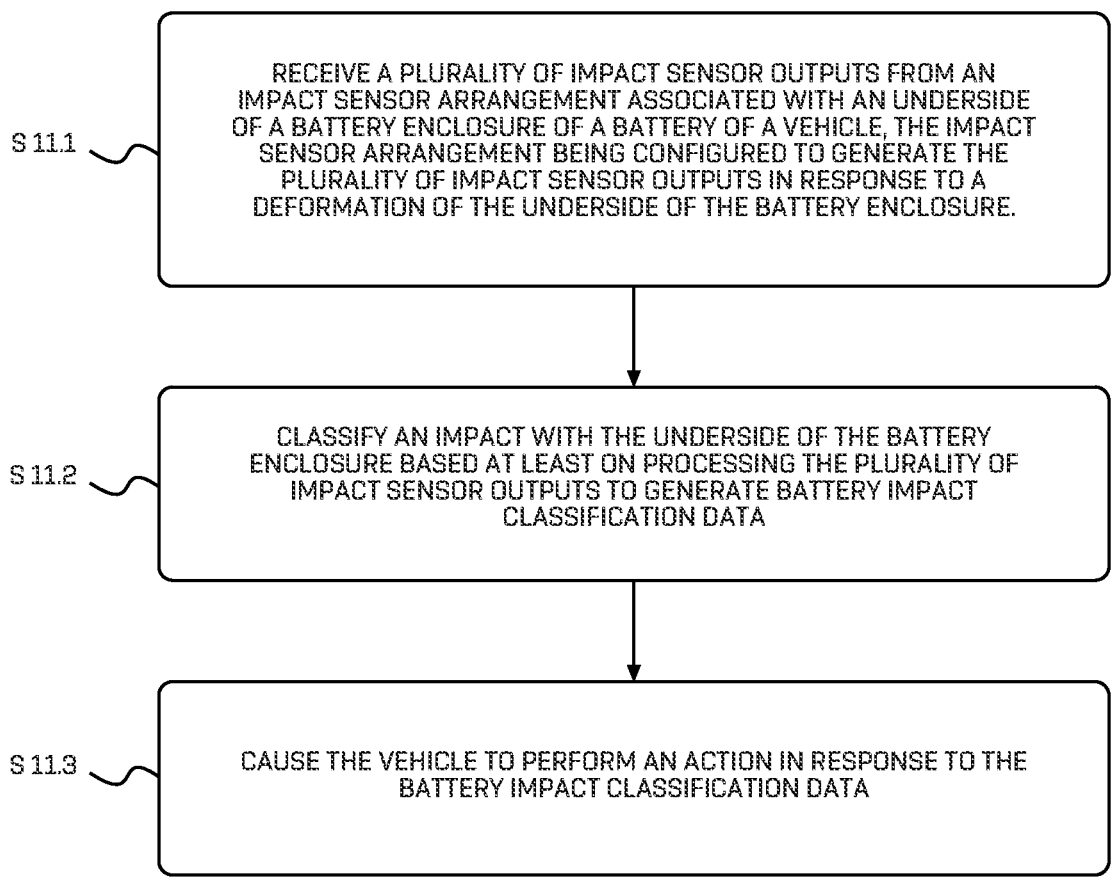
FIG. 11 is a flow diagram of a method of classifying an impact with the underside of a battery enclosure in an example.

FIG. 11 is a flow diagram of a method of generating battery impact classification data, which may comprise an indication of a level of severity of an impact with the underside of a battery enclosure in an example according to steps S11.1, S11.2 and S11.3.

Figure 12:
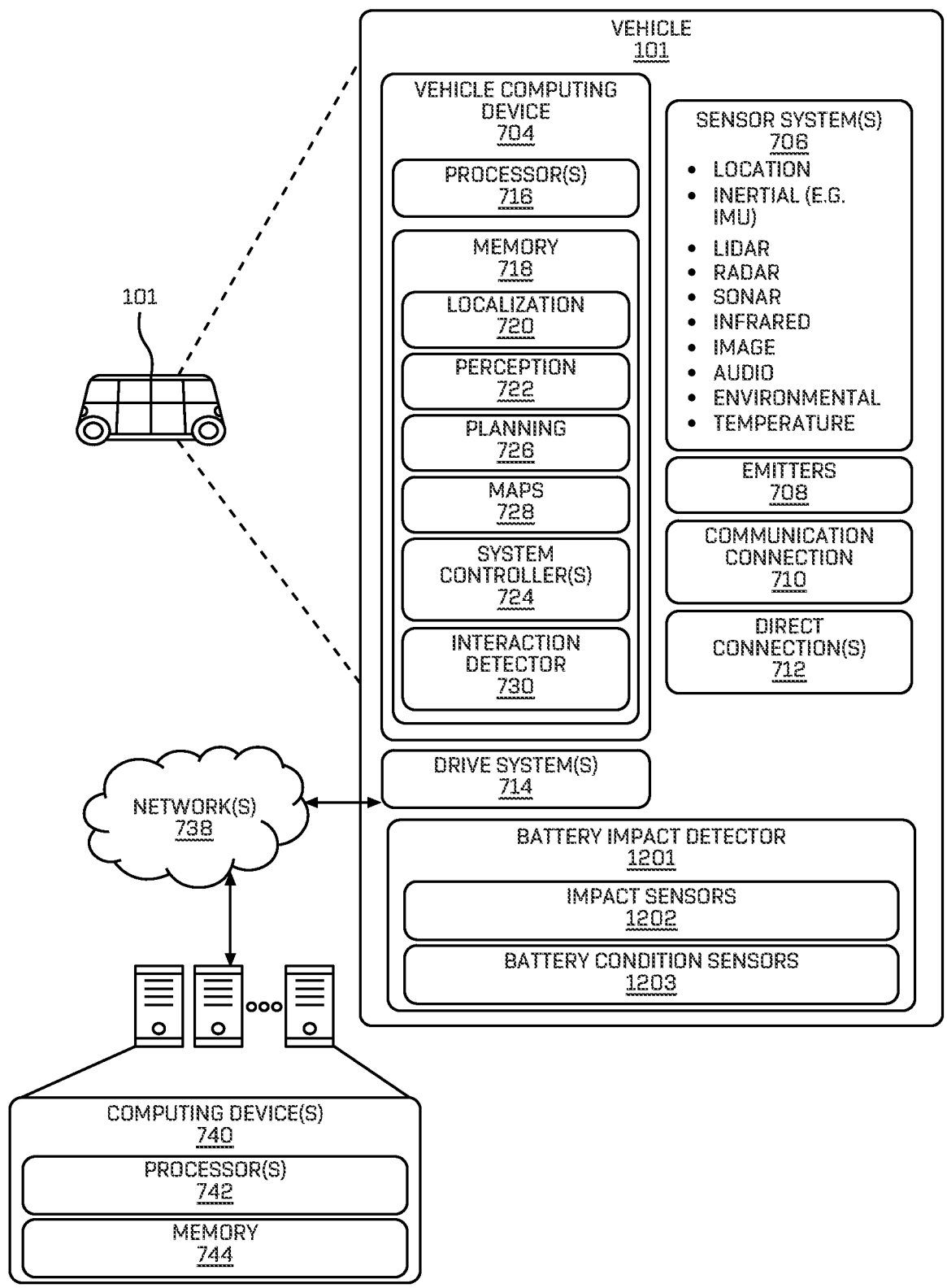
FIG. 12 is a block diagram of an example of an autonomous vehicle comprising a system for classifying an impact with the underside of a battery enclosure of the vehicle.

FIG. 12 depicts a block diagram of an example system for implementing at least some of the techniques described herein. The system includes the vehicle 101. The vehicle 101 has a battery impact detector 1201, comprising impact sensors 1202 associated with the underside of a battery enclosure and battery condition sensors 1203. The vehicle computing device 704 may comprise the one or more processors configured to generate the indication of a level of severity of an impact. Alternatively, the one or more processors may be stand-alone device(s) and may send the indication of the impact to the vehicle computing device 704.

In some instances, the vehicle 101 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 101 may be a fully or partially autonomous vehicle having any other level or classification. Moreover, in some instances, the techniques described herein may be usable by non-autonomous vehicles as well.

The vehicle 101 can include vehicle computing device(s) 704, one or more sensor systems 706, one or more emitters 708, one or more communication connections 710, at least one direct connection 712 (e.g., for physically coupling the vehicle 101 to exchange data and/or to provide power), and one or more drive systems 714.

In some instances, the sensor(s) 706 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 706 may include multiple instances of each of these or other types of sensors. For instance, the LIDAR sensors may include individual LIDAR sensors located at the corners, front, back, sides, and/or top of the vehicle 101. As another example, the cameras may include multiple cameras disposed at various locations about the exterior and/or interior of the vehicle 101. The sensor(s) 706 may provide input to the vehicle computing device(s) 704.

The vehicle 101 may also include the emitter(s) 708 for emitting light and/or sound. The emitter(s) 708 in this example may include interior audio and visual emitter(s) to communicate with passengers of the vehicle 101. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 101 may also include the communication connection(s) 710 that enable communication between the vehicle 101 and one or more other local or remote computing device(s). For instance, the communication connection(s) 710 may facilitate communication with other local computing device(s) on the vehicle 101 and/or the drive system(s) 714. Also, the communication connection(s) 708 may additionally or alternatively allow the vehicle 101 to communicate with other nearby computing device(s) (e.g., other nearby vehicles, traffic signals, etc.). The communication connection(s) 710 may additionally or alternatively enable the vehicle 101 to communicate with a computing device 736.

The vehicle computing device(s) 704 can include one or more processors 716 and memory 718 communicatively coupled with the one or more processors 716. In the illustrated example, the memory 718 of the vehicle computing device(s) 704 stores a localization component 720 perception component 722, a planning component 724, one or more maps 726, and one or more system controllers 728. The memory 718 may also include an interaction detector 730. The interaction detector 730 may be at least part of the primary impact detection system. The interaction detector 730 may be configured to monitor output voltages from the one or more interaction sensors, as part of a main control unit, and determine whether a low-level interaction has taken place. Though depicted in FIG. 12 as residing in memory 718 for illustrative purposes, it is contemplated that the localization component 720, the perception component 722, the planning component 724, the one or more maps 726, and the one or more system controllers 728 may additionally, or alternatively, be accessible to the vehicle 101 (e.g., stored remotely).

In some instances, the localization component 720 may be configured to receive data from the sensor system(s) 706 to determine a position and/or orientation of the vehicle 101 (e.g., one or more of an x-, y-, z-position, roll, pitch, or yaw). For example, the localization component 720 may include and/or request/receive a map 726 of an environment and may continuously determine a location and/or orientation of the autonomous vehicle within the map 726.

In some instances, the perception component 722 can include functionality to perform object detection, segmentation, and/or classification. In some examples, the perception component 722 can provide processed sensor data that indicates a presence of an entity that is proximate to the vehicle 101 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 724 may determine a location of a user based on image data of an environment received from the user using, for example, bags of binary words with image-based features, artificial neural network, and the like. Further, the planning component 724 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 101 may stop to pick up a passenger. In at least one example, the planning component 724 may determine a pickup location based at least in part on determining a user identity (e.g., determined via image recognition or received as an indication from a user device, as discussed herein).

In some instances, the one or more maps 726 may be used by the vehicle 101 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 726 may be stored based on, for example, a characteristic (e.g., type of entity, time of day, day of week, season of the year, etc.). Storing multiple maps 726 may have similar memory requirements, but increase the speed at which data in a map may be accessed.

In at least one example, the vehicle computing device(s) 704 can include one or more system controllers 728. The system controller 728 can be configured to control steering, propulsion, braking, safety, emitters, communication, and other systems of the vehicle 101. The system controller(s) 728 can communicate with and/or control corresponding systems of the drive system(s) 714 and/or other components of the vehicle 101. The system controller(s) 728 may be communicatively coupled to one or more sensors of the vehicle sensor system(s) 706.

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive system with one or more other local or remote computing device(s).

In some examples, the vehicle 101 can send operational data, including raw or processed sensor data from the sensor system(s) 706, to one or more computing device(s) 740 via the network(s) 738. The one or more computing device(s) 740 may comprise one or more processors 742 and memory 744. The one or more computing devices 740 may be remote from the vehicle.

In some instances, aspects of some or all of the components discussed herein may include any models, algorithms, and/or machine learning algorithms. For example, the component(s) in the memory 718, 744 may be implemented as a neural network. As can be understood in the context of this disclosure, a neural network can utilize machine learning, which can refer to a broad class of such algorithms in which an output is generated based on learned parameters.

EXAMPLE CLAUSES

A. A vehicle comprising: a battery having a battery enclosure; an impact sensor arrangement associated with an underside of the battery enclosure configured to generate a plurality of impact sensor outputs in response to an impact with the underside of the battery enclosure; a battery condition sensor configured to generate a battery condition sensor output in response to a condition of the battery indicative of a battery fault; and one or more processors configured to: receive the plurality of impact sensor outputs and the battery condition sensor output; and classify an impact with the underside of the battery enclosure based on processing the plurality of impact sensor outputs and the battery condition sensor output to generate battery impact classification data, the battery impact classification data comprising an indication of one of a plurality of levels of severity of the impact; and cause the vehicle to perform an action in response to the battery impact classification data, the action corresponding to the indication.

B. The vehicle of example A, wherein generating the battery impact classification data comprises determining an indication of a risk that the battery enclosure is pierced by the impact.

C. The vehicle of example A or example B, wherein generating the battery impact classification data comprises determining an indication of a degree of risk that the impact has caused damage to the battery having potential to affect safe operation of the battery.

D. The vehicle of any one of examples A to C, wherein the action comprises stopping the vehicle in response to an indication of a given level of severity of the impact.

E. The vehicle of any one of examples A to D, wherein processing the plurality of impact sensor outputs comprises, at least in part, establishing a degree of correlation between data representing the plurality of impact sensor outputs as a function of position and impact characterizing data representing impact sensor outputs as a function of position associated with pre-determined classes of impact.

F. A method comprising:
receiving a plurality of impact sensor outputs from an impact sensor arrangement associated with an underside of a battery enclosure of a battery of a vehicle, the impact sensor arrangement being configured to generate the plurality of impact sensor outputs in response to a deformation of the underside of the battery enclosure; classifying an impact with the underside of the battery enclosure based at least on processing the plurality of impact sensor outputs to generate battery impact classification data; and causing the vehicle to perform an action in response to the battery impact classification data.

G. The method of example F, wherein generating battery impact classification data comprises: determining a degree of similarity between a spatial distribution of magnitudes of the plurality of impact sensor outputs and impact characterizing data comprising a plurality of spatial distributions of magnitudes of impact sensor outputs.

H. The method of example G, wherein generating battery impact classification data comprises: determining a location of an impact according to the determined degree of similarity between a spatial distribution of magnitudes of the plurality of impact sensor outputs and impact characterizing data comprising a plurality of spatial distributions of magnitudes of impact sensor outputs.

I. The method of example G or example H, wherein generating battery impact classification data comprises: determining an impact type of an impact according to the determined degree of similarity between a spatial distribution of magnitudes of the plurality of impact sensor outputs and impact characterizing data comprising a plurality of spatial distributions of magnitudes of impact sensor outputs.

J. The method of any one of examples F to I, wherein generating battery impact classification data comprises: receiving an output from at least one battery condition sensor, the battery condition sensor being configured to generate a battery condition sensor output in response to a condition of the battery indicative of a battery fault, wherein classifying the impact with the underside of the battery enclosure is based at least in part on processing the plurality of impact sensor outputs and the at least one battery condition sensor.

K. The method of example J, wherein the battery condition sensor comprises a sensor selected from: a gas pressure sensor, wherein the second criterion for a given level of severity comprises a change in the output of the pressure sensor indicative of a fall in pressure within the battery enclosure associated with a piercing of the battery enclosure; a gas composition sensor, wherein the second criterion for a given level of severity comprises a change in the output of the gas composition sensor indicative of an increase of a concentration of a gas within the battery enclosure indicative of a fault in one or more battery cells; a voltage sensor and the second criterion for a given level of severity comprises a change in the output of the voltage sensor indicative of a fault in one or more battery cells; and a coolant pressure sensor configured to detect a pressure of a coolant of the battery and the second criterion for a given level of severity comprises a change in the pressure of the coolant indicative of damage to a coolant channel.

L. The method of any one of examples F to K, wherein the underside of the battery enclosure comprises a protective panel having a stiffness that is greater than a stiffness of part of the battery enclosure distal from the protective panel and the impact sensor arrangement comprises strain gauges associated with the protective panel.

M. The method of any one of examples F to L, wherein the battery comprises a battery module within the battery enclosure, the battery module having a battery module enclosure enclosing a plurality of battery cells, wherein the impact sensor arrangement comprises contact sensors configured to detect contact between the battery enclosure and the battery module enclosure.

N. The method of any one of examples F to M, wherein the battery comprises a battery module within the battery enclosure, the battery module having a battery module enclosure enclosing a plurality of battery cells, wherein the impact sensor arrangement comprises accelerometers associated with the underside of the battery enclosure, wherein a further plurality of accelerometers is associated with battery module, and wherein generating battery impact classification data is based at least on processing the respective outputs of the accelerometers associated with the underside of the battery enclosure and outputs of the further plurality of accelerometers associated with battery module, to determine a relative degree of acceleration of the battery module in comparison with a degree of acceleration of the underside of the battery enclosure.

O. The method of any one of examples F to N comprising: providing the plurality of impact sensor outputs to a neural network; and receiving battery impact classification data at the output of the neural network.

P. The method of any one of examples F to O, comprising: providing the plurality of impact sensor outputs and the output of at least one battery condition sensor as inputs to a neural network; and receiving battery impact classification data at the output of the neural network.

Q. The method of any one of examples F to P, wherein: the battery impact classification data comprises an indication of one of a plurality of levels of severity of the impact; and the action in response to the battery impact classification data is dependent on the level of severity of the impact.

R. The method of any one of examples F to Q, comprising: causing the vehicle to stop and instructing occupants of the vehicle to leave the vehicle in response to an indication of a first level of severity of impact; and causing the vehicle to continue a journey in response to an indication of a second level of severity of impact.

S. One or more non-transitory computer-readable media storing instructions executable by one or more processors, wherein the instructions, when executed, cause the one or more processors to perform operations comprising: receiving a plurality of impact sensor outputs from an impact sensor arrangement associated with an underside of a battery enclosure of a battery of a vehicle, the impact sensor arrangement being configured to generate the plurality of impact sensor outputs in response to a deformation of the underside of the battery enclosure; classifying an impact with the underside of the battery enclosure based at least on processing the plurality of impact sensor outputs to generate battery impact classification data; and causing the vehicle to perform an action in response to the battery impact classification data.

T. The one or more non-transitory computer-readable media of example S, wherein classifying an impact with the underside of the battery enclosure comprises: determining a degree of similarity between a spatial distribution of magnitudes of the plurality of impact sensor outputs and impact characterizing data comprising a plurality of spatial distributions of magnitudes of impact sensor outputs.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A vehicle comprising:
a battery having a battery enclosure;
an impact sensor arrangement associated with an underside of the battery enclosure configured to generate a plurality of impact sensor outputs in response to an impact with the underside of the battery enclosure;
a battery condition sensor configured to generate a battery condition sensor output in response to a condition of the battery indicative of a battery fault; and
one or more processors configured to:
receive the plurality of impact sensor outputs and the battery condition sensor output;
classify an impact with the underside of the battery enclosure based on processing the plurality of impact sensor outputs and the battery condition sensor output to generate battery impact classification data, the battery impact classification data comprising an indication of one of a plurality of levels of severity of the impact; and
cause the vehicle to perform an action in response to the battery impact classification data, the action corresponding to the indication.

2. The vehicle of claim 1, wherein generating the battery impact classification data comprises determining an indication of a risk that the battery enclosure is pierced by the impact.

3. The vehicle of claim 1, wherein generating the battery impact classification data comprises determining an indication of a degree of risk that the impact has caused damage to the battery having potential to affect safe operation of the battery.

4. The vehicle of claim 1, wherein the action comprises stopping the vehicle in response to an indication of a given level of severity of the impact.

5. The vehicle of claim 1, wherein processing the plurality of impact sensor outputs comprises, at least in part, establishing a degree of correlation between data representing the plurality of impact sensor outputs as a function of position and impact characterizing data representing impact sensor outputs as a function of position associated with pre-determined classes of impact.

6. A method comprising:
receiving a plurality of impact sensor outputs from an impact sensor arrangement associated with an underside of a battery enclosure of a battery of a vehicle, the impact sensor arrangement being configured to generate the plurality of impact sensor outputs in response to a deformation of the underside of the battery enclosure;
receiving a battery condition sensor output from a battery condition sensor;
classifying an impact with the underside of the battery enclosure based at least on processing the plurality of impact sensor outputs and the battery condition sensor output to generate battery impact classification data; and
causing the vehicle to perform an action in response to the battery impact classification data.

7. The method of claim 6, wherein generating battery impact classification data comprises:
determining a degree of similarity between a spatial distribution of magnitudes of the plurality of impact sensor outputs and impact characterizing data comprising a plurality of spatial distributions of magnitudes of impact sensor outputs.

8. The method of claim 7, wherein generating battery impact classification data comprises:
determining a location of an impact according to the determined degree of similarity between a spatial distribution of magnitudes of the plurality of impact sensor outputs and impact characterizing data comprising a plurality of spatial distributions of magnitudes of impact sensor outputs.

9. The method of claim 7, wherein generating battery impact classification data comprises:
determining an impact type of an impact according to the determined degree of similarity between a spatial distribution of magnitudes of the plurality of impact sensor outputs and impact characterizing data comprising a plurality of spatial distributions of magnitudes of impact sensor outputs.

10. The method of claim 6, wherein the battery condition sensor comprises a sensor selected from:

a gas pressure sensor, wherein a criterion for a given level of severity comprises a change in the output of the pressure sensor indicative of a fall in pressure within the battery enclosure associated with a piercing of the battery enclosure;

a gas composition sensor, wherein a criterion for a given level of severity comprises a change in the output of the gas composition sensor indicative of an increase of a concentration of a gas within the battery enclosure indicative of a fault in one or more battery cells;

a voltage sensor and a criterion for a given level of severity comprises a change in the output of the voltage sensor indicative of a fault in one or more battery cells; and a coolant pressure sensor configured to detect a pressure of a coolant of the battery and a criterion for a given level of severity comprises a change in the pressure of the coolant indicative of damage to a coolant channel.

11. The method of claim 6, wherein the underside of the battery enclosure comprises a protective panel having a stiffness that is greater than a stiffness of part of the battery enclosure distal from the protective panel and the impact sensor arrangement comprises strain gauges associated with the protective panel.

12. The method of claim 6, wherein the battery comprises a battery module within the battery enclosure, the battery module having a battery module enclosure enclosing a plurality of battery cells, wherein the impact sensor arrangement comprises contact sensors configured to detect contact between the battery enclosure and the battery module enclosure.

13. The method of claim 6, wherein the battery comprises a battery module within the battery enclosure, the battery module having a battery module enclosure enclosing a plurality of battery cells, wherein the impact sensor arrangement comprises accelerometers associated with the underside of the battery enclosure, wherein a further plurality of accelerometers is associated with battery module, and wherein generating battery impact classification data is based at least on processing the respective outputs of the accelerometers associated with the underside of the battery enclosure and outputs of the further plurality of accelerometers associated with battery module, to determine a relative degree of acceleration of the battery module in comparison with a degree of acceleration of the underside of the battery enclosure.

14. The method of claim 6 comprising:
providing the plurality of impact sensor outputs to a neural network; and
receiving battery impact classification data at the output of the neural network.

15. The method of claim 6, comprising:
providing the plurality of impact sensor outputs and the output of at least one battery condition sensor as inputs to a neural network; and
receiving battery impact classification data at the output of the neural network.

16. The method of claim 6, wherein:
the battery impact classification data comprises an indication of one of a plurality of levels of severity of the impact; and
the action in response to the battery impact classification data is dependent on the level of severity of the impact.

17. The method of claim 16, comprising:
causing the vehicle to stop and instructing occupants of the vehicle to leave the vehicle in response to an indication of a first level of severity of impact; and
causing the vehicle to continue a journey in response to an indication of a second level of severity of impact.

18. One or more non-transitory computer-readable media storing instructions executable by one or more processors, wherein the instructions, when executed, cause the one or more processors to perform operations comprising:
receiving a plurality of impact sensor outputs from an impact sensor arrangement associated with an underside of a battery enclosure of a battery of a vehicle, the impact sensor arrangement being configured to generate the plurality of impact sensor outputs in response to a deformation of the underside of the battery enclosure;
receiving a battery condition sensor output from a battery condition sensor;
classifying an impact with the underside of the battery enclosure based at least on processing the plurality of impact sensor outputs and the battery condition sensor output to generate battery impact classification data; and
causing the vehicle to perform an action in response to the battery impact classification data.

19. The one or more non-transitory computer-readable media of claim 18, wherein classifying an impact with the underside of the battery enclosure comprises:
determining a degree of similarity between a spatial distribution of magnitudes of the plurality of impact sensor outputs and impact characterizing data comprising a plurality of spatial distributions of magnitudes of impact sensor outputs.

* * * * *